(12) United States Patent
Scardullo

(10) Patent No.: US 6,443,035 B1
(45) Date of Patent: Sep. 3, 2002

(54) HYBRID POWER INPUT QUILL FOR TRANSMISSIONS

(75) Inventor: Angelo A. Scardullo, Mesa, AZ (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/961,117

(22) Filed: Sep. 20, 2001

(51) Int. Cl.[7] .............................................. F16H 37/06
(52) U.S. Cl. ..................... 74/665 H; 74/417; 74/665 K
(58) Field of Search ........................ 74/665 G, 665 GB, 74/665 H, 665 S, 665 T, 665 K, 417

(56) References Cited

U.S. PATENT DOCUMENTS

| | | | |
|---|---|---|---|
| 2,739,490 A | * 3/1956 | Coles | 74/417 |
| 5,149,311 A | 9/1992 | Luijten | 475/343 |
| 5,182,960 A | 2/1993 | Chary | 74/417 |
| 5,233,886 A | 8/1993 | Bossler, Jr. | 74/665 |
| 5,802,918 A | 9/1998 | Chen et al. | 74/416 |
| 6,058,791 A | * 5/2000 | Brunet | 74/15.63 |

* cited by examiner

*Primary Examiner*—Dirk Wright
(74) *Attorney, Agent, or Firm*—Black Lowe & Graham PLLC

(57) ABSTRACT

A hybrid input quill for torque transmissions is provided. The hybrid input quill includes an input shaft with an input pinion gear, with an attached bevel pinion gear allowing auxiliary power to be extracted from the transmission separate from the main transmission gearing system. Through the use of spacing devices, the positions of the input pinion gear and the bevel pinion gear may be independently adjusted. The invention includes transmissions incorporating hybrid input quills, including face gear driven transmissions utilized for driving rotorcraft and any other mechanically driven vehicle.

21 Claims, 3 Drawing Sheets

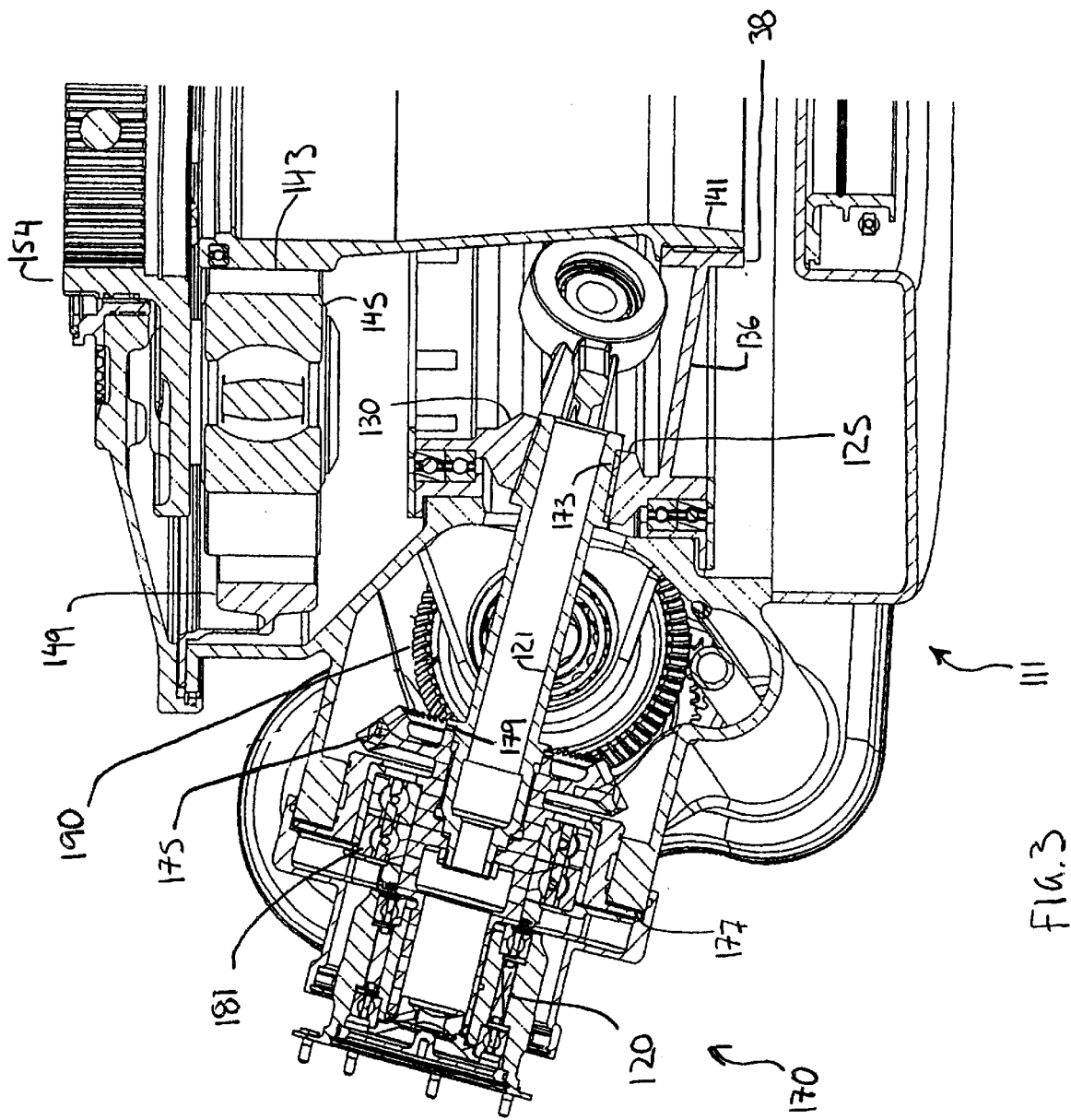

HYBRID POWER INPUT QUILL FOR TRANSMISSIONS

FIELD OF THE INVENTION

This invention relates generally to torque transmission systems, and specifically to lightweight transmission systems for use on rotorcraft, propeller-driven aircraft, and any other mechanically driven vehicle.

BACKGROUND OF THE INVENTION

A torque transmission system transfers power from an engine or motor to driven components of a device or vehicle. In a rotorcraft or a propeller-driven aircraft, the proprotor transmission system transfers power from a turbine engine or other engine to the rotor or propeller of the rotorcraft or aircraft. A torque transmission system may direct power from one or more engines to a single driven component or to a number of driven components. The transmission system may also direct power to auxiliary systems. In a rotorcraft, a proprotor transmission system often directs power from two turbine engines to a single rotor, auxiliary systems, and a secondary rotor.

In many devices and vehicles, the rotational velocity of the driven component or components is significantly lower than the rotational velocity of the output of the driving engines or motors, thus the engine or motor rotational velocity must be reduced by the transmission system. In reducing the rotational velocity of the engine or motor output, torque is increased by the transmission system through a series of intermediate gear stages and shafts before final output to the driven component or components. In rotorcraft or propeller-driven aircraft, large gears are required near the final output of the proprotor transmission system to handle the high torque being supplied to the proprotor(s). A typical main rotor transmission housing these large gears is often the heaviest gear box in a rotorcraft.

Transmission size, weight, and reliability considerations, are important, especially in aircraft. Prior art transmissions typically power the auxiliary systems directly from the main transmission gears or by adding additional gearing to the main transmission system. This increases size, and adds weight and complexity.

FIG. 1 is a full cross-sectional view of a prior art concentric face gear transmission 10 for a rotorcraft. Power from a turbine engine (not shown) is transferred via an input clutch 20 to an input shaft 21. An input spur pinion 23, connected to the input shaft 21, is meshed between a lower face gear 25 and an upper face gear 30. The combination of the input shaft 21 and the input spur pinion 23 will be referred to herein as an input quill. A lower thrust bearing 27 for the lower face gear 25 is located radially inwardly of the lower face gear 25. An upper thrust bearing 32 for the upper face gear 30 is located radially outwardly of the upper face gear 30. Torque from the input shaft 21 is split between the lower face gear 25 and the upper face gear 30 at a single stage gear meshing 34.

The upper face gear 30 includes a web 36, connected to a female spline 38. The female spline 38 of the upper face gear 30 meshes with a male spline 41. The male spline 41 is connected to a sun gear 43. The sun gear 43 meshes with an inner radial portion of a planet gear 45. The planet gear 45, having an axis 47, rotates about the sun gear 43. An outer radial portion of the planet gear 45 meshes with a ring gear 49. The planet gears 45 are carried by a planet carrier 54, which rotates around a static support assembly 56. Power from the planet carrier 54 is used to drive the rotor of the aircraft through a main rotor drive shaft (not shown).

The cross section of FIG. 1 is taken through an input spur pinion 23 and an idler pinion 61. In the prior art transmission 10, the input spur pinion 23 is located opposite a second input spur pinion (not shown) and the idler pinion 61 is located opposite a second idler pinion (not shown).

The idler pinion 61 is connected to an idler shaft 60, which rotates around an axis that nearly intersects the axis of the static support assembly 56. The idler pinion 61 meshes with the lower face gear 25 and the upper face gear 30 at a single stage idler mesh 63. The idler pinion transfers and equalizes torque between the upper face gear 30 and the lower face gear 25.

In the prior art concentric face gear transmission 10 shown in FIG. 1, primary power torque from the first face gear stage of the transmission 10 is output from the upper face gear 30 through its web 36 and female spline 38. Auxiliary power is withdrawn from the transmission through the idler shaft 60, which is driven by the upper face gear 30 and lower face gear 25. The upper face gear 30 and the lower face gear 25 must carry the torque driving the auxiliary system together with the main power torque, necessitating heavier face gears. Also, the extraction of auxiliary power through the use of an idler pinion 61 and idler shaft 60 requires that the transmission housing and configuration be sized to accommodate larger idler components when they are utilized to drive auxiliary systems.

More generally, many forms of transmissions are often driven by input pinion or bevel gears on shafts, i.e. input quills, with auxiliary power extracted through additional gear components that mesh with the main transmission gears. For example, other prior art transmissions utilize input quills linked to bevel gears to drive secondary gearing in the transmission, without utilizing a face gear configuration. Alternately other prior art utilizes input pinion gears with single face gears, not utilizing concentric torque face gears. Examples of such transmissions are shown in FIGS. 1 and 2 of U.S. Pat. No. 5,802,918, Chen et al., Sep. 8, 1998. Independent of the configuration of the transmission, auxiliary power takeoffs for prior art transmissions as described herein, and other prior art, utilize the main power transmission system to drive the auxiliary power system, increasing its weight, and requiring the space and complexity of additional gearing within the main power system to drive the auxiliary power takeoffs.

Therefore, an unmet need exists for a transmission system which allows for auxiliary power takeoff without burdening the main transmission system with the weight, size, and complexity of the auxiliary power takeoff.

SUMMARY OF THE INVENTION

The present invention presents a hybrid input quill that presents a lightweight, compact, and uncomplicated system for driving auxiliary power takeoffs while driving a main transmission.

The hybrid input quill of the present invention includes at least one input pinion and one bevel pinion on a single input shaft allowing for two drive systems to be driven from the single hybrid input quill. The hybrid input quill may be incorporated into a concentric face gear transmission assembly where the input pinion gear drives the main power system of the device or vehicle, and the bevel gear drives auxiliary power systems. The bevel gear drives the auxiliary power system utilizing gearing outside of the primary power train reducing the weight, size, and complexity of the primary power train in the transmission.

According to an aspect of the invention, power is still transmitted to the auxiliary power system through the hybrid input quill when used in a multiengine configuration and the engine directly driving the hybrid input quill fails or is shut down. A clutch is utilized to disconnect the hybrid input quill from its input motor or engine, allowing the input quill to be driven by the balance of the transmission and other engine(s) or motor(s), providing extra safety or security in the drive system. The then-indirectly powered hybrid quill continues to drive its connected auxiliary system.

The invention provides flexibility for shimming, spacing, or otherwise locating the gearing systems for the primary power and auxiliary power takeoffs independently, to provide for optimum gear mesh configuration. Thus, the location of the bevel pinion may be shimmed or positioned separate from the input pinion. The input pinion and the bevel pinion may be independently positioned to obtain optimum gear meshing. The location of the input pinion assembly may be shimmed or positioned relative to the main transmission. Shimming of the shaft pinion separate from shimming of the bevel pinion permits both the shaft pinion. and the bevel pinion to be located optimally for their respective gearing systems.

BRIEF DESCRIPTION OF THE DRAWINGS

The preferred and alternative embodiments of the present invention described in detail below with reference to the following drawings.

FIG. 3 is a partial cross sectional view of a concentric face gear transmission assembly incorporating the hybrid input quill, and showing a bevel power takeoff gear meshing with the bevel pinion of the hybrid input quill.

DETAILED DESCRIPTION OF THE INVENTION

Figure 1:
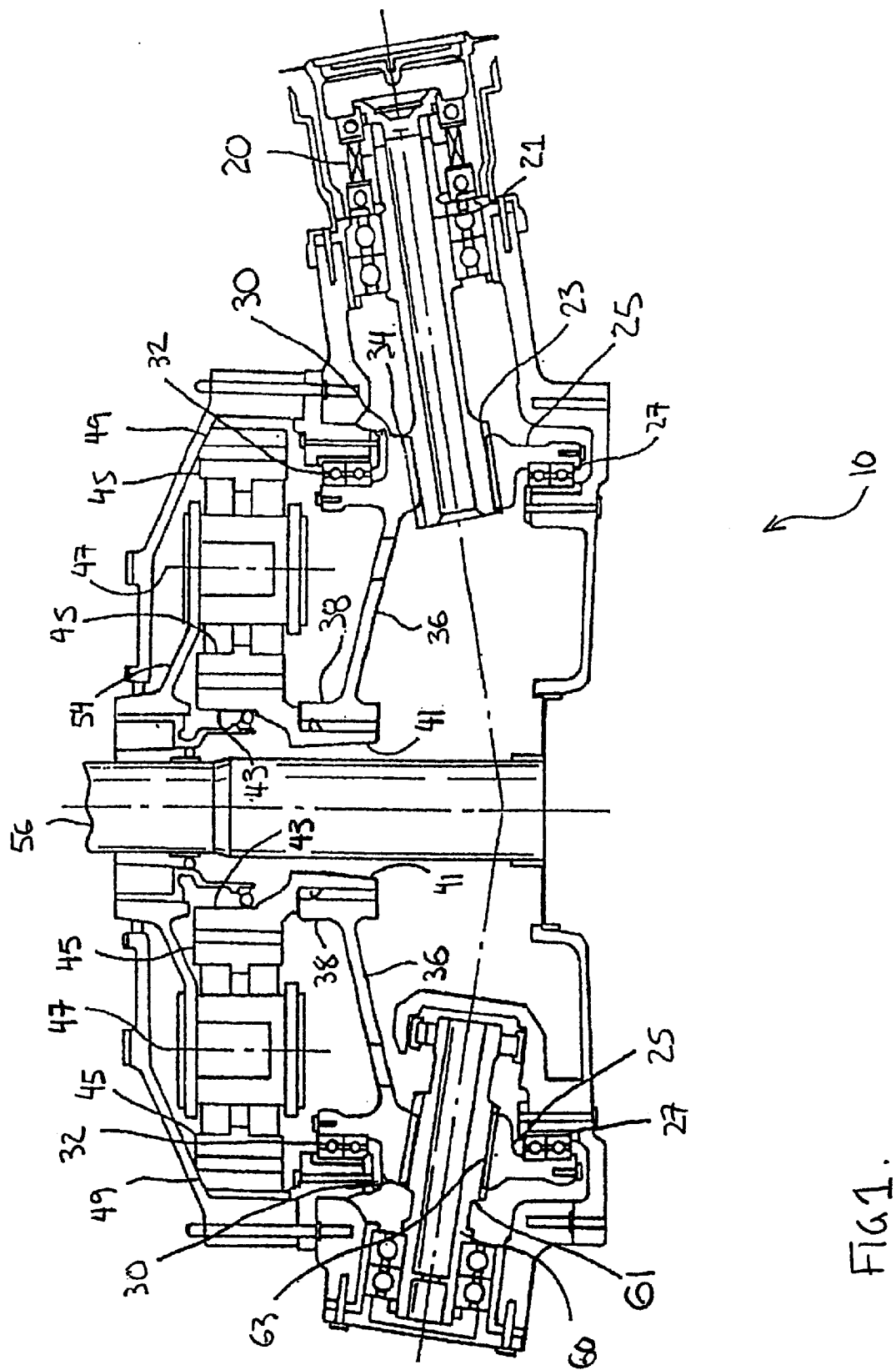
FIG. 1 is a full cross sectional view of a prior art concentric face gear transmission assembly with a standard input quill.
Figure 2:
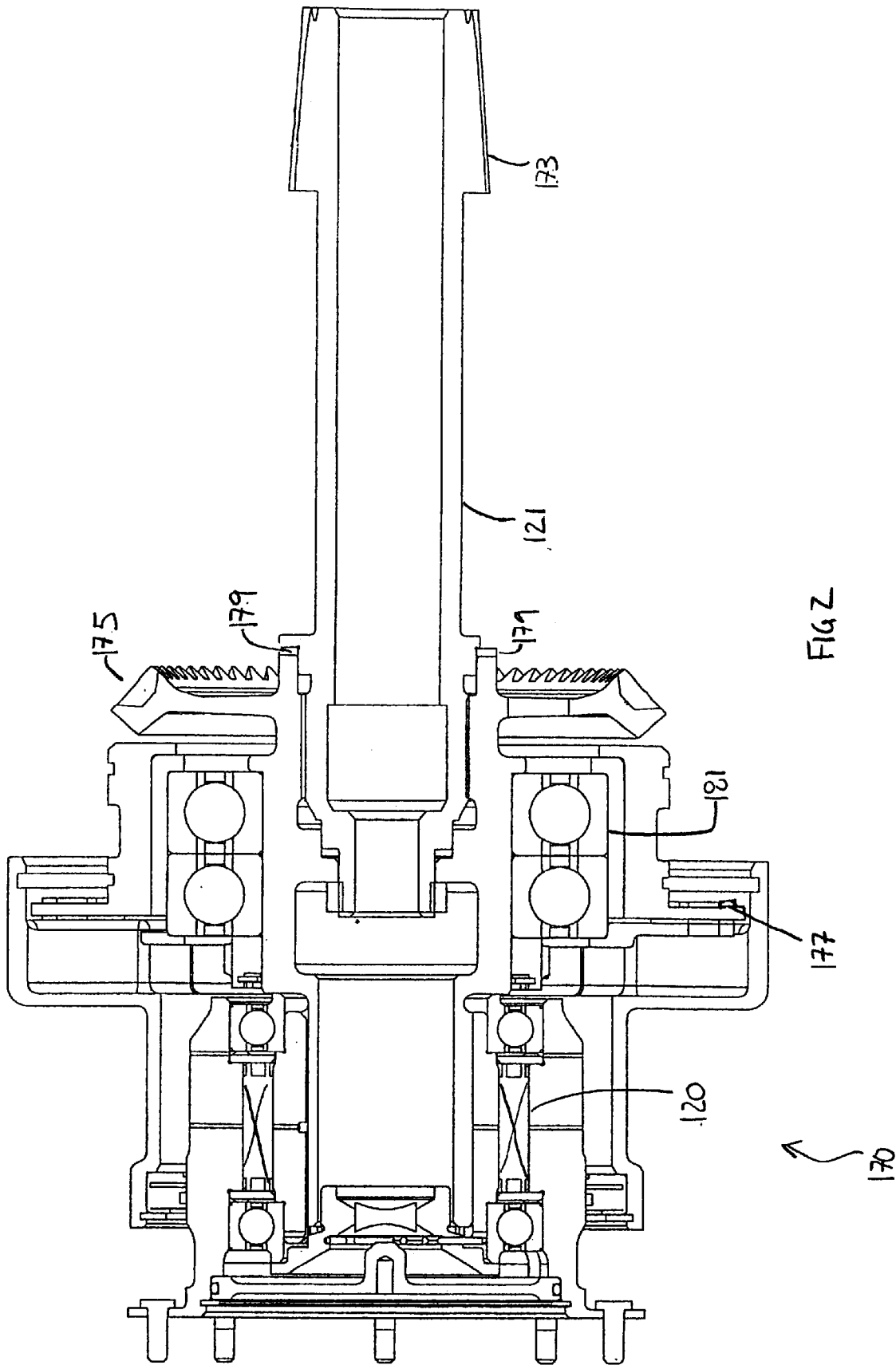
FIG. 2 is a cross section view of the hybrid input quill of the instant invention with input shaft, shaft pinion, bevel pinion, and related components.

FIG. 2 is a cross section of a hybrid input quill 170. The hybrid input quill 170 includes an input shaft 121 with an attached shaft pinion gear 173. The input shaft 121 is driven by an engine or motor (not shown) through an input clutch 120. The input shaft 121 is supported by, and allowed to rotate within, the main quill bearings 181. Also attached to the input shaft 121 is a bevel pinion gear 175. In a presently preferred embodiment, the bevel pinion gear 175 is used to drive auxiliary systems, and the shaft pinion gear 173 is used to drive the main transmission (not shown). In this embodiment, the bevel pinion gear 175, and the shaft pinion gear 173, are beveled, permitting the hybrid input quill 170 to be detachably mounted to the main transmission (not shown).

The location of the shaft pinion gear 173 and the bevel pinion gear 175 can be adjusted as desired through the use of shims or alternative spacing devices. The location of the shaft pinion gear 173 in a presently preferred embodiment shown in FIG. 2 may be adjusted through the shaft pinion shim(s) 177. Varying the thickness of the shaft pinion shim(s) 177 allows flexible positioning of the input shaft 121 (with the attached pinion gear 173) co-linear with its longitudinal axis, relative to the main transmission (not shown). The location of the bevel pinion gear 175 in a presently preferred embodiment can be adjusted relative to the shaft pinion gear 173 through using different thickness bevel pinion shim(s) 179. The bevel pinion shim(s) 179 are interposed between the input shaft 121 and the bevel pinion gear 175 permitting flexible, but precise, positioning of the bevel gear along the input shaft 121. By adjusting the thickness of the shaft pinion shim(s) 177 and the bevel pinion shim(s) 179 in concert, and independently, the location of the shaft pinion gear 173, and the bevel pinion gear 175 can be adjusted independently to obtain optimum gear meshing with their counterparts.

In alternative embodiments, the relative sizes, locations, and the overall configurations of the shaft pinion gear 173 and the bevel pinion gear 175 may vary considerably. The input shaft 121 can be any length as desired for a particular application. Further, suitable alternative coupling and spacing or positioning methods as known in the art can be utilized to connect the bevel pinion gear 175 to the input shaft 121. The shaft pinion gear 173 and the bevel pinion gear 175 themselves may also be of different types or configurations as desired for various applications.

As shown in FIG. 3, the present invention also includes the hybrid input quill utilized in a concentric face gear transmission assembly 111. The transmission assembly 111 in FIG. 3 includes the hybrid power quill 170 shown in FIG. 2.

The transmission assembly 111 thus includes the hybrid power quill assembly 170, which meshes with the first stage reduction gearing of the transmission. Power from an engine or motor (not shown) is transmitted via clutch 120 to the input shaft 121. The input shaft 121 is connected to the input pinion gear 173. The input pinion gear 173 is meshed between a lower face gear 125, and an upper face gear 130. In the embodiment shown in FIG. 3, the lower face gear 125 includes a web 136, which leads to a female spline 138. The female spline 138 of the lower face gear 125 meshes with a male spline 141. The male spline 141 is connected to a sun gear 143 driving the secondary gearing system of the transmission. The sun gear 143 meshes with the inner-radial portion of a planet gear 145. The outer-radial portion of the planet gear 145 meshes with a ring gear 149. The planet gear is held by a planet carrier 154. Power from the planet carrier 154 may be used to drive the device or vehicle through a drive shaft, or further gearing. Not shown in FIG. 3 are other input quills, which may provide power from other motor(s) or engine(s). Also not shown in FIG. 3 are idler gears, which transmit torque between the upper and lower face gears 130 and 125. The transmission assembly 111 may have one or more input quills and one or more idler gears. In a presently preferred embodiment, two hybrid input quill assemblies 170 are utilized to provide power from two turbine engines, providing auxiliary power output to two sources, while combining the power from the two engines into the main drive system.

The hybrid input quill assembly 170 shown in FIG. 3 is the same as the hybrid input quill assembly 170 shown in FIG. 2. The position of the input shaft 121 and the shaft pinion gear 173 may be adjusted through the shaft pinion shim(s) 177. Attached to the input shaft 121 is the bevel pinion gear 175, forming the hybrid input quill 170. The location of the bevel pinion gear 175 may be adjusted by varying the thickness of the bevel pinions shim(s) 179. The bevel pinion gear 175 meshes with the bevel power takeoff gear 190. The bevel power takeoff gear is connected directly to the auxiliary power devices (not shown) designed to be driven by the auxiliary power takeoff from this transmission. Alternatively, the bevel power takeoff gear 190 is suitably connected indirectly to the auxiliary power devices (not shown) via additional clutches or gearing (not shown). In a presently preferred embodiment, one or more of the auxiliary systems is a rear rotor for a rotorcraft. The bevel pinion shim(s) 179 and the shaft pinion shim(s) 177 allow the location of the bevel pinion gear 175 to be adjusted to properly mesh with the bevel power takeoff gear 190, while allowing independent adjustment of the location of the shaft pinion gear 173. This permits proper meshing of the shaft pinion gear 173 with the upper face gear 130, and lower face gear 125.

In a presently preferred embodiment, two hybrid input quills 170 are utilized. Both hybrid quills drive the upper and lower face gears 125 and 130, and each drive their own bevel power takeoff gear 190, providing power from two engines or motors (not shown). If one engine or motor becomes inoperative, the other engine or motor, through the opposing face gears 125 and 130, drives the hybrid input quill shaft 121 of the inoperative engine, thus driving the bevel power takeoff gear 175 of the inoperative engine. This provides additional security and safety in a one engine or motor inoperative condition.

In alternative embodiments, the hybrid input quill 170 may be utilized in a wide variety of transmissions where auxiliary power takeoff is desired while minimizing the size, weight, and complexity of the overall transmission.

While the preferred embodiment of the invention has been illustrated and described, as noted above, many changes can be made without departing from the spirit and scope of the invention. For example, alternative spacing or attachment methods may be utilized for positioning the bevel gear 175 and the pinion gear 173 independently within the hybrid input quill 170. Such devices include set or adjustment screws, or threaded couplings with locking provisions. Alternative gear configurations may be used, including conventional bevel gears mating with conventional bevel gears or conventional straight gears used in place of the input pinion gear end or the bevel pinion gear. Further, more than two gears may be attached to a single input shaft. In other embodiments, the primary power may be extracted from the bevel gear, while the pinion gear provides auxiliary power. Transmissions may also include standard input quills, without the hybrid input quill system, as well as hybrid input quills with bevel gears. The invention is not limited to rotorcraft or aircraft transmissions, but may be utilized in other vehicle or transmission applications where lightweight, simplicity, and size limitations are important. Accordingly, the scope of the invention is not limited by the disclosure of the preferred embodiment. Instead, the invention should be determined entirely by reference to the claims that follow.

What is claimed is:

1. A hybrid quill for providing auxiliary power and main power to a transmission, comprising:
   a hybrid input shaft, having a longitudinal axis and a circumference, and an input end and a distal end;
   an input pinion gear attached about the circumference of the hybrid input shaft and arranged for meshing with a main drive adapted for driving a device or a vehicle;
   at least one bevel pinion gear attached about the circumference of the hybrid input shaft and arranged for meshing with an auxiliary drive adapted for driving an auxiliary system of the device or vehicle; and
   the at least one bevel pinion gear being laterally spaced apart from the input pinion gear along the longitudinal axis of the hybrid input shaft.

2. The hybrid input quill of claim 1, wherein:
   the input pinion gear is attached about the circumference of the hybrid input shaft at the distal end of the hybrid input shaft; and
   the at least one bevel pinion gear is attached about the circumference of the hybrid input shaft at the input end of the hybrid input shaft.

3. The hybrid input quill of claim 1, wherein:
   the input pinion gear is arranged for detachably meshing with the main drive; and
   the at least one bevel pinion gear is arranged for detachably meshing with the auxiliary drive.

4. The hybrid input quill of claim 1, further comprising:
   at least one input pinion gear spacing device, rotatably attached to the hybrid input shaft, and interposed between the hybrid input shaft and the main drive, arranged for adjusting the position of the hybrid input shaft and the input pinion gear relative to the main drive, co-linear with the longitudinal axis of the hybrid input shaft.

5. The hybrid input quill of claim 1, further comprising:
   at least one bevel pinion gear spacing device, interposed between the hybrid input shaft and the bevel pinion gear, arranged for adjusting the position of the bevel pinion gear relative to the hybrid input shaft, along the longitudinal axis of the hybrid input shaft.

6. The hybrid input quill of claim 2, further comprising:
   at least one bevel pinion gear spacing device, interposed between the hybrid input shaft and the bevel pinion gear, arranged for positioning the bevel pinion gear relative to the hybrid input shaft, along the longitudinal axis of the hybrid input shaft.

7. A gear positioning system for a hybrid input quill for providing auxiliary power and main power to a transmission, comprising:
   a hybrid input shaft, having a circumference, rotatably supported by at least one bearing;
   an input pinion gear attached about the circumference of the hybrid input shaft;
   an input quill spacing device attached to the at least one bearing, interposed between the at least one bearing and a transmission assembly;
   a bevel pinion gear spacing device, attached to the hybrid input shaft; and
   a bevel pinion gear attached to the bevel pinion gear spacing device and attached about the circumference of the hybrid input shaft.

8. The gear positioning system of claim 7, wherein:
   the input quill spacing device comprises at least one shim.

9. The gear positioning system of claim 7, wherein:
   the bevel pinion gear spacing device comprises at least one shim.

10. A transmission with a hybrid input quill, comprising:
    a hybrid input shaft, having a longitudinal axis and a circumference;
    an input gear, having a plurality of input teeth, attached about the circumference of the hybrid input shaft;
    a driving gear, adapted for driving a device or a vehicle, having a plurality of driven gear teeth, contacting the input teeth;
    at least one auxiliary input gear, having a plurality of auxiliary input teeth, attached about the circumference of the hybrid input shaft;
    at least one auxiliary driven gear, not connected to the driving gear, adapted for driving an auxiliary system of the device or vehicle, having a plurality of auxiliary driven teeth, contacting the auxiliary input teeth.

11. The transmission of claim 10, wherein the driving gear is a face gear.

12. The transmission of claim 10, wherein:

the input teeth are arranged for detachably contacting with the driven gear teeth; and the auxiliary input teeth are arranged for detachably contacting with the auxiliary driven teeth.

13. The transmission of claim 10, further comprising:

at least one input quill spacing device, rotatably attached to the hybrid input shaft, and interposed between the hybrid input shaft and the driving gear, arranged for adjusting the position of the hybrid input shaft and the input gear relative to the driving gear, co-linear with the longitudinal axis of the hybrid input shaft.

at least one auxiliary gear spacing device, interposed between the hybrid input shaft and the auxiliary input gear, arranged for positioning the auxiliary input gear relative to the hybrid input shaft, along the longitudinal axis of the hybrid input shaft.

14. The transmission of claim 13, wherein:

the input quill spacing device comprises at least one shim.

15. The transmission of claim 13, wherein:

the bevel pinion gear spacing device comprises at least one shim.

16. A face gear transmission with a hybrid input quill, comprising:

a hybrid input shaft having a longitudinal axis and a circumference;

an input pinion gear, having a plurality of input pinion teeth, attached about the circumference of the hybrid input shaft;

a face gear, adapted for driving a device or a vehicle, having a plurality of face gear teeth, contacting the input pinion teeth;

at least one bevel pinion gear, having a plurality of bevel pinion teeth, attached about the circumference of the hybrid input shaft;

at least one bevel auxiliary gear, adapted for driving an auxiliary system of the device or vehicle, having a plurality of bevel auxiliary teeth, contacting the bevel pinion teeth.

17. The transmission of claim 16, further comprising:

a second hybrid input shaft, having a circumference;

a second input pinion gear, having a plurality of second input pinion teeth, attached about the circumference of the second hybrid input shaft, contacting the face gear teeth;

at least one second bevel pinion gear, having a plurality of second bevel pinion teeth, attached about the circumference of the second hybrid input shaft;

at least one bevel auxiliary gear, adapted for driving a second auxiliary system of the device or vehicle, having a plurality of second bevel auxiliary teeth, contacting the second bevel pinion teeth.

18. The transmission of claim 16, wherein:

the input pinion teeth are arranged for detachably contacting with the face gear teeth; and the bevel pinion teeth are arranged for detachably contacting with the bevel auxiliary teeth.

19. The transmission of claim 16, further comprising:

at least one input pinion quill spacing device, rotatably attached to the hybrid input shaft arranged for adjusting the position of the hybrid input shaft and the input pinion gear relative to the face gear, co-linear to the longitudinal axis of the hybrid input shaft; and at least one bevel pinion gear spacing device, attached to the hybrid input shaft and connected to the bevel pinion gear arranged for positioning the bevel pinion gear relative to the hybrid input shaft, along the longitudinal axis of the hybrid input shaft.

20. The gear positioning system of claim 19, wherein:

the input quill spacing device comprises at least one shim.

21. The gear positioning system of claim 19, wherein:

the bevel pinion gear spacing device comprises at least one shim.

* * * * *